(12) United States Patent
Alessandrini

(10) Patent No.: US 7,240,648 B2
(45) Date of Patent: Jul. 10, 2007

(54) RADIAL ENGINE

(76) Inventor: Paolo Alessandrini, Via Tagliazucchi, 32, Modena (IT) 1-41100

( * ) Notice: Subject to any disclaimer, the term of this patent is extended or adjusted under 35 U.S.C. 154(b) by 0 days.

(21) Appl. No.: 10/545,317

(22) PCT Filed: Feb. 20, 2004

(86) PCT No.: PCT/EP2004/001714

§ 371 (c)(1),
(2), (4) Date: Sep. 22, 2005

(87) PCT Pub. No.: WO2004/074092

PCT Pub. Date: Sep. 2, 2004

(65) Prior Publication Data

US 2006/0130780 A1    Jun. 22, 2006

(30) Foreign Application Priority Data

Feb. 21, 2003  (IT)  .......................... MO2003A0035

(51) Int. Cl.
*F02B 75/22* (2006.01)
(52) U.S. Cl. .................................... 123/54.1; 123/54.2
(58) Field of Classification Search ............... 123/54.1, 123/54.5–54.8, 54.2
See application file for complete search history.

(56) References Cited

U.S. PATENT DOCUMENTS

| 1,938,270 | A |   | 12/1933 | Woolson |
| 2,030,078 | A | * | 2/1936  | Vaughn .................... 244/17.21 |
| 2,192,881 | A | * | 3/1940  | De Bothezat ............. 123/41.56 |
| 3,123,058 | A | * | 3/1964  | Wooge ....................... 123/54.2 |
| 4,010,719 | A |   | 3/1977  | Lappa |
| 5,269,270 | A | * | 12/1993 | Suzuki et al. ............... 123/310 |

FOREIGN PATENT DOCUMENTS

| DE | 31 34 791 | 3/1983 |
| GB | 149 397   | 8/1920 |
| WO | 98/45580  | 10/1998 |
| WO | 99/24696  | 5/1999 |

OTHER PUBLICATIONS

International Search Report for PCT/EP2004/001714 dated Jan. 7, 2005.

* cited by examiner

*Primary Examiner*—Noah P. Kamen
(74) *Attorney, Agent, or Firm*—Nixon & Vanderhye P.C.

(57) ABSTRACT

A four-stroke radial engine comprises cylinders arranged radially with respect to a driving shaft of said radial engine and pistons associated with said cylinders, said pistons being connected to said driving shaft by means of respective connecting rods which are rotatably supported on a same crank pivot of said driving shaft.

17 Claims, 8 Drawing Sheets

RADIAL ENGINE

This application is the US national phase of international application PCT/EP2004/001714 filed 20 Feb. 2004 which designated the U.S. and claims benefit of IT MO2003A000035, filed 21 Feb. 2003, the entire contents of each of which are hereby incorporated by reference.

The invention concerns a radial internal combustion engine, particularly a radial internal combustion engine for aircraft. The invention further concerns a helicopter provided with an Otto cycle engine having three cylinder arranged in a double V configuration, said cylinder being placed at angular intervals of 120° from one another with respect to a driving shaft of the engine.

Radial internal combustion engines for aircraft are known which comprise cylinders that are obtained inside a block and are arranged radially with respect to a longitudinal axis of the engine, at constant angular intervals. A respective piston is associated with each cylinder.

Said pistons actuate, by means of connecting rods, a driving shaft positioned along said axis.

The driving shaft in turn actuates a rotor connected to propellers, or to blades, for the propulsion of an aircraft, in particular for the propulsion of an aeroplane or of a helicopter.

Two-stroke engines are known in which the cylinders are obtained inside a cylinder block which, during operation, rotates around the axis of the driving shaft, thereby dragging the pistons that simultaneously move alternately inside the respective cylinders.

The aforementioned engines furthermore comprise a stationary head block that surrounds the cylinder block and within which the cylinder block can rotate.

Each cylinder comprises a combustion chamber defined by a cavity obtained in the cylinder block and by a surface of the head block cooperating with said cavity.

During rotation of the cylinder block, the cavity faces different zones of the aforementioned surface.

In one zone of the aforementioned surface an opening is obtained through which a fuel mixture is supplied into the combustion chamber.

In a further zone of the aforementioned surface a further opening is obtained through which exhaust fumes produced by combustion of the aforementioned fuel mixture are evacuated from the combustion chamber.

When the cylinder block rotates with respect to the head block, each cavity is made to interact in sequence with the aforementioned opening and the aforementioned further opening, thereby enabling feeding and subsequent discharging of the cylinders.

In other words, in the engines disclosed above, the timing operations occur thanks to the movement of the cylinder block with respect to the head block.

In the engines disclosed above inlet pipes and exhaust pipes are provided, which are connected to the aforementioned opening and to the aforementioned further opening, respectively, the inlet pipes end the exhaust pipes extending significantly along the axis of the driving shaft.

This means that the driving shaft has a considerably longitudinal extension and consequently a great weight. Furthermore, the driving shaft is made of high-performance materials that are subjected to dedicated processing, which involves high costs.

As the driving shaft is rather heavy, the ratio between power generated by the engine and weight of the latter is unsatisfactory.

Four-stroke engines are further known which comprise a stationary block cylinder, i.e. a block cylinder that is not provided with rotational movement, unlike what is disclosed with reference to the above-mentioned two-stroke engines.

Each cylinder of said four-stroke engines is provided with inlet valves, which control delivery of a fuel mixture into a combustion chamber obtained in the cylinder.

Each cylinder is furthermore provided with exhaust valves, which control evacuation of the exhaust fumes produced by combustion of the fuel mixture from the combustion chamber.

In a first type of four-stroke engine, each cylinder is connected to the driving shaft by means of a connecting rod connected to a corresponding crank pivot obtained on the driving shaft.

A drawback of engines of this type is that the driving shaft is rather long and therefore rather heavy.

In a further type of four-stroke engine, one of the pistons is directly connected to a crank pivot of the driving shaft by means of a master rod, whilst the remaining pistons are connected to the aforementioned master rod by means of connecting rods.

A drawback of engines of the latter type is that the connection between the master rod and the connecting rods has a complicated and asymmetrical geometrical configuration.

A further drawback of the engines of this type is that the master rod is subjected to a particularly intense state of stress that can cause its failure.

Furthermore, in four-stroke engines it is necessary to provide a high number of inlet valves to generate a turbulence that distributes the fuel mixture inside the combustion chamber in an optimal manner.

Such a high number of inlet valves enables substantially the entire fuel mixture to be effectively affected by combustion in such a way as to optimize the performance of the engines.

A still further drawback of four-stroke engines is that the high number of valves with which they are provided makes the engines heavy and increases their overall dimensions.

Furthermore, since actuating organs such as cams and rocker arms are associated with each valve, high inertia forces are generated as a result.

A still further drawback of the engines disclosed above is that significant torsional vibrations are produced during operation, which vibrations, if the engine has been installed in an aircraft, adversely affects the handling of the aircraft and jeopardizes the comfort of pilots and passengers, if any.

The size of said torsional vibrations is proportional to the axial length of the driving shaft.

Torsional vibrations are consequently accentuated in engines that have a driving shaft of considerable length, in other words in two- and four-stroke engines in which each connecting rod is associated with a respective crank pivot.

An object of the invention is to improve radial internal combustion engines, in particular radial engines for aircraft. Another object is to increase the ratio between the power generated by the radial internal combustion engines and the weight of said engines.

A further object the invention is to reduce torsional vibrations generated during operation of radial internal combustion engines.

A still further object of the invention is to obtain a radial engine provided with great efficiency.

According to the invention, a four-stroke radial engine is provided comprising cylinders arranged radially with respect to a driving shaft of said radial engine and pistons associated with said cylinders, said pistons being connected to said driving shaft by means of respective connecting rods, wherein said connecting rods are rotatably supported on a same crank pivot of said driving shaft.

Owing to this aspect of the invention, it is possible to obtain a four-stroke radial engine having a driving shaft with rather a reduced length and limited weight.

The four-stroke radial engine according to the invention is therefore provided with a more advantageous ratio between the power generated by the engine and the weight of the engine, if compared with prior-art engines.

As the length of the driving shaft is less than that of the shafts of prior-art radial engines, it is possible to significantly limit the torsional vibrations of the engine. Owing to the invention it is further possible to obtain a four-stroke radial engine that has moderate overall dimensions. Furthermore, the use in a helicopter of an engine having cylinders arranged in a double V configuration, said cylinders being placed at angular intervals of 120° from one another, allows an optimized mass distribution to be obtained. In addition, due to the reduced overall dimensions, it is possible to obtain an improved exploitation of the spaces with respect to the known engines.

The invention may be better understood and carried out with reference to the attached drawings which show an exemplifying and non-limitative embodiment, in which.

Figure 1:
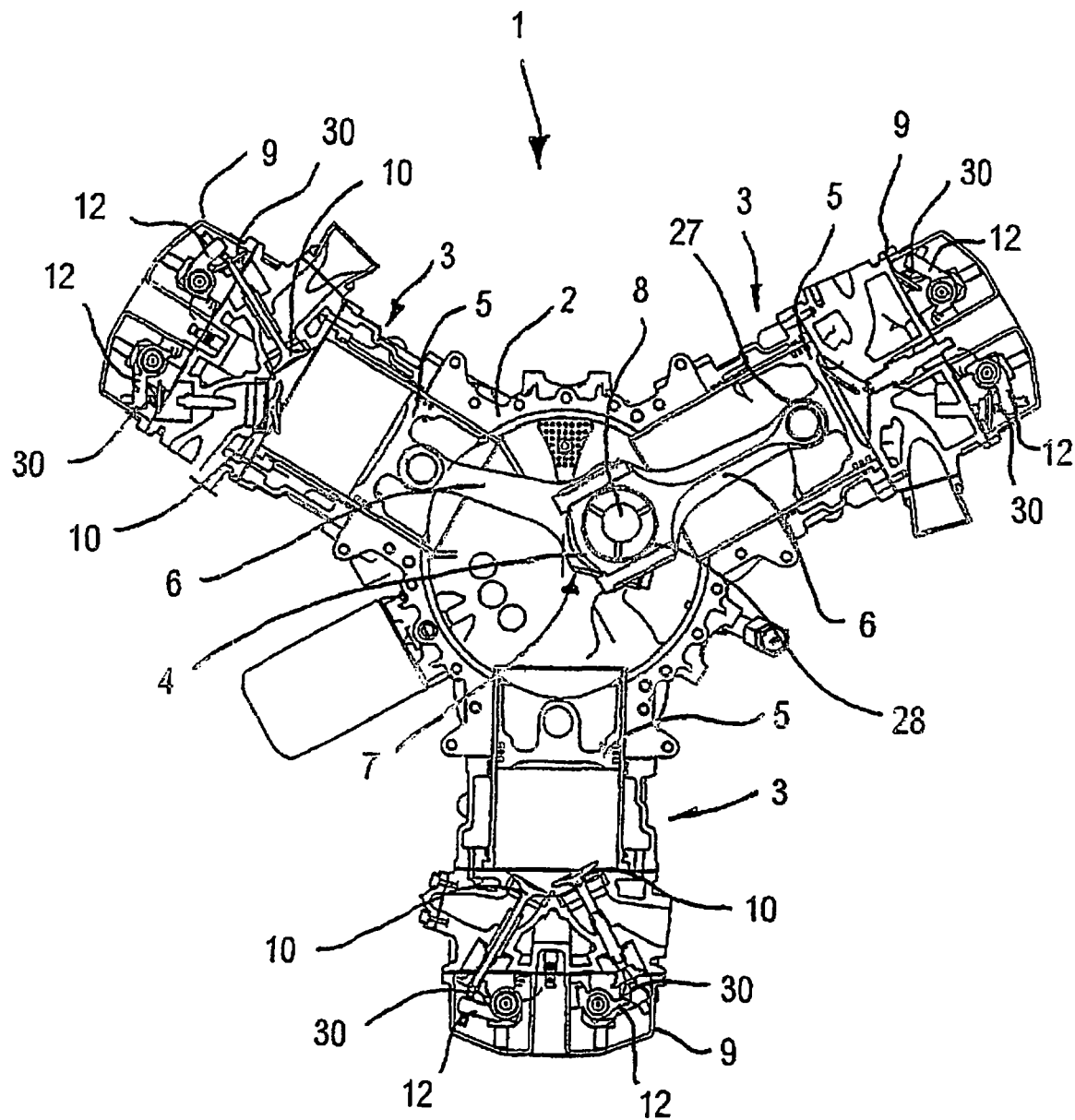
FIG. 1 is a cross-section of a four-stroke and three-cylinder radial engine.
Figure 2:
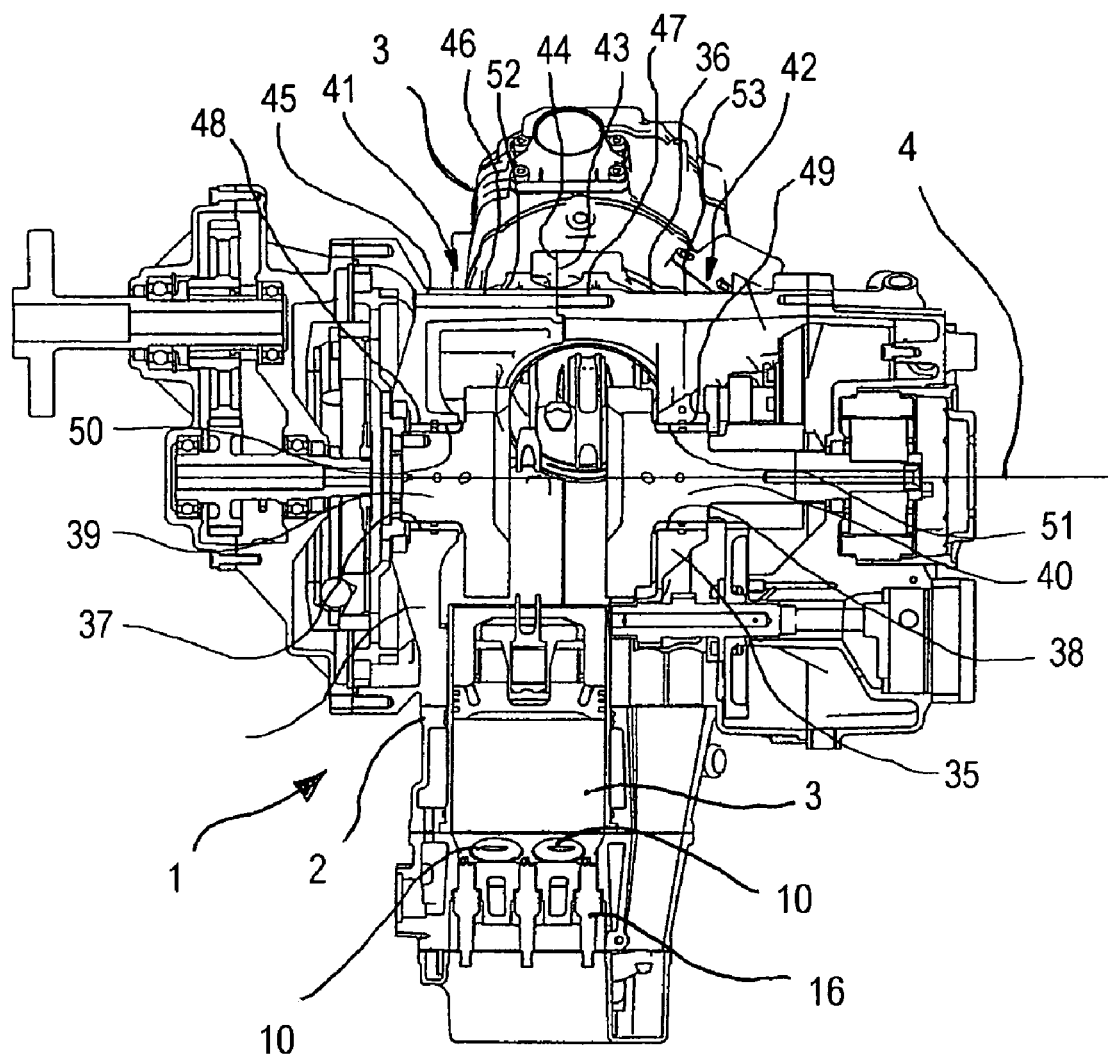
FIG. 2 is a longitudinal section of the radial engine of FIG. 1.
Figure 3:
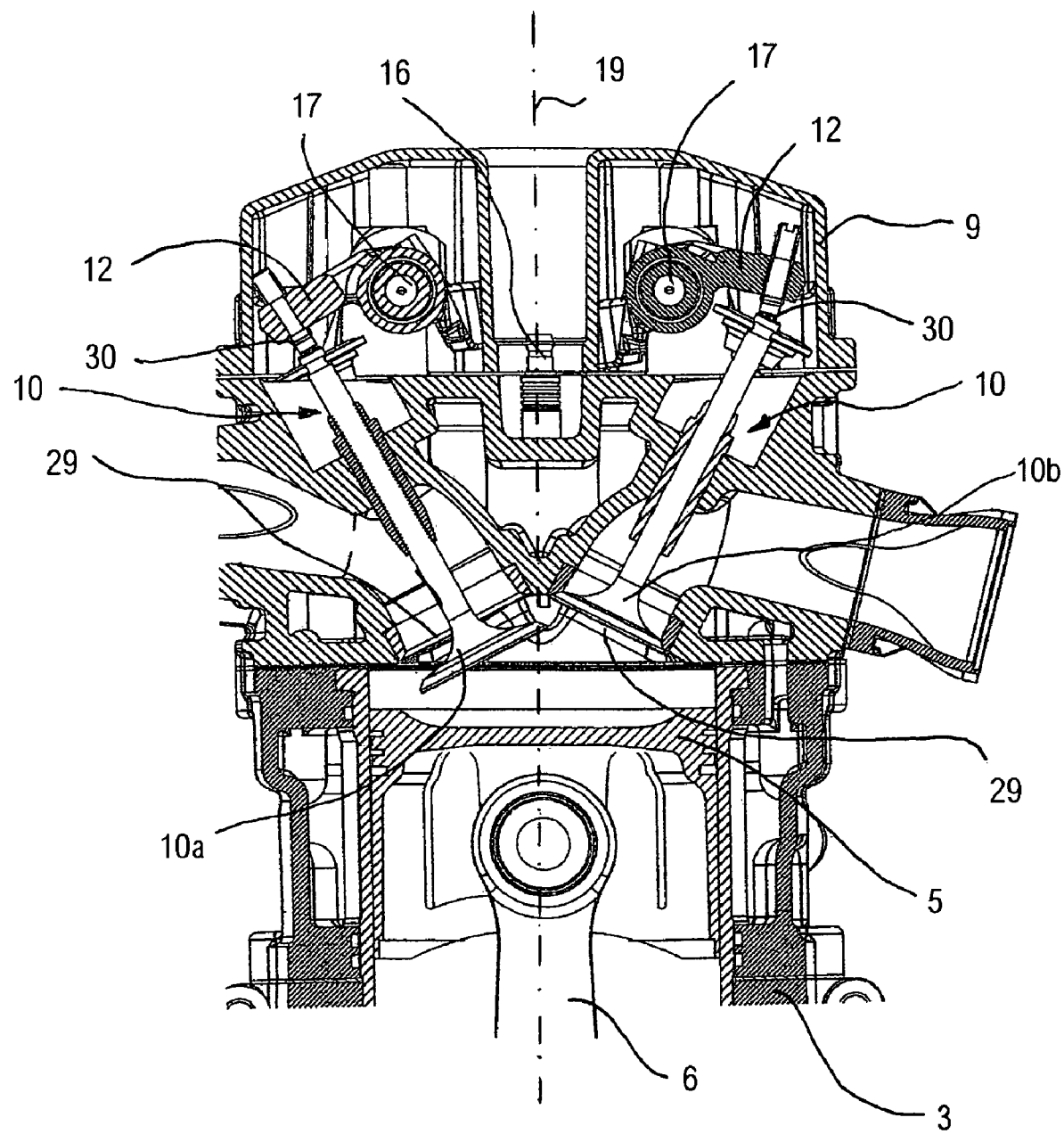
FIG. 3 is a detail of FIG. 1, showing a timing system for the delivery of the fuel mixture into and for the expulsion of the exhaust fumes from a cylinder of the radial engine.

With reference to FIGS. 1 to 6, a four-stroke radial engine 1 is shown comprising a cylinder block 2 in which three cylinders 3 are obtained that are arranged radially with respect to a longitudinal axis 4 of the radial engine 1, at angular intervals of 120° from one another.

During operation of the radial engine 1, the cylinder block 2 is maintained in a stationary configuration.

Inside each cylinder 3 a piston 5 slides that is connected by means of a connecting rod 6 to a driving shaft 7 extending along the longitudinal axis 4.

Each connecting rod 6 comprises a first end 27 rotatably coupled with the respective piston 5, and a second end 28, opposite the first end 27, rotatably coupled with the driving shaft 7.

The second ends 28 of the three connecting rods 6 are rotatably supported on a same crank pivot 8 of the driving shaft 7.

This enables the longitudinal extension of the driving shaft 7 to be limited and rather a light driving shaft to be thereby obtained.

Owing to the invention, it is possible to obtain a radial engine 1 in which the ratio between the power generated by the engine and the weight of the engine is 2.17 HP/kg, as opposed to a ratio of approximately 1.69 HP/kg measured in engines manufactured according to the prior art.

The cylinder-block 2 comprises an end wall 34 and a further end wall 35 opposite to the end wall 34. The end wall 34 and the further end wall 35 extend substantially continuously around the driving shaft 7 from a side wall 36 of the cylinder-block 2.

The end wall 34 is provided with an opening 37 housing an end 39 of the driving shaft 7. The further end wall 35 is provided with a further opening 38 housing a further end 40 of the driving shaft 7. In this way, the driving shaft 7 is supported by the end wall 34 and the further end wall 35.

The opening 37 and the further opening 38 are provided with housings 50, 51 in which a first bush 48 and a second bush 49 are received. The first shaft end 39 and the second shaft end 40 are received within the first bush 48 and the second bush 49 respectively. In this way the driving shaft 7 is rotatably mounted in the housings 50, 51 by means of the first bush 48 and the second bush 49.

The cylinder-block 2 comprises two distinct parts, a first part 41 provided with a first contact surface 43 and a second part 42 provided with a second contact surface 44. The first part 41 and the second part 42 are mutually connected along the respective contact surfaces 43 and 44. The first contact surface 43 and the second contact surface 44 face one another and are arranged substantially transversely to the longitudinal axis 4 of the driving shaft 7. In particular, the contact surfaces 43, 44 divide the side wall 36 into a first side wall portion 52 and a second side wall portion 53.

Through holes 46 extending substantially parallel to the longitudinal axis 4 are provided in the first side wall portion 52. Threaded holes 47 extending substantially parallel to the longitudinal axis 4 are provided in the second side wall portion 53. When the first part 41 is associated to the second part 42 and the first contact surface 43 matches the second contact surface 44, each through hole 46 faces a corresponding threaded hole 47.

Screws 45 are received in holes 46, 47 for connecting the first part 41 and the second part 42 together.

In this way the cylinder-block 2 is formed by two separate shells, the first part 41 and the second part 42, that can be assembled in order to form a crankcase around the driving shaft 7.

Owing to its lightness, the engine according to the invention is particularly suitable for being installed in aeroplanes that can be flown without provision for a pilot aboard them.

Such aeroplanes can be used to conduct reconnaissance, for example in the military or meteorological spheres, or to prevent and monitor fires.

A head 9 in which openings 29 are obtained is associated with each cylinder 3, distribution valves 10 being associated to the openings 29.

The distribution valves 10 comprise a pair of inlet valves 10a and a pair of exhaust valves 10b.

A rocker arm 12 is associated to each distribution valve 10, the rocker arm 12 being hinged to the head 9 in one of its intermediate zones 17.

The rocker arm 12 comprises a first end portion 30 that interacts with the distribution valve 10 and a second end portion 31 cooperating with an end 20 of a push rod 13.

The push rod 13 further comprises a further end 22, opposite the end 20, that interacts with a cam element 14, having an appropriately shaped profile, that is integral with a shaft 15. The shaft 15 is rotated by the driving shaft 7, for example by gear transmission.

During operation, the cam element 14 causes a shift of the push rod 13 parallelly to its longitudinal axis.

The push rod 13, in turn, by means of the rocker arm 12, controls the distribution valve 10.

Owing to the push rods 13, it is possible to obtain a radial engine provided with great reliability, in particular it is possible to obtain a more reliable engine than those according to prior art in which the rocker arms are controlled directly by cams that are integral with a shaft rotated by a belt which connects said shaft to the driving shaft.

In prior-art engines, the aforementioned belt in fact constitutes a critical component that must be frequently changed for safety reasons.

Furthermore, rigid actuating organs, i.e. the push rods 13, allow greater precision to be obtained in the transmission of movement between the driving shaft 7 and the rocker arms 12 compared with what occurs with the prior-art flexible transmission organs.

Each cylinder 3 is provided with three spark plugs 16 arranged parallel to a longitudinal axis 19 of the cylinder 3 and lying on a plane passing through the aforementioned longitudinal axis 19 and containing the driving shaft 7.

The inlet valves 10 are arranged in such a way that the pair of inlet valves 10a and the pair of exhaust valves 10b are positioned on opposite side with respect to the aforementioned plane.

Figure 4:
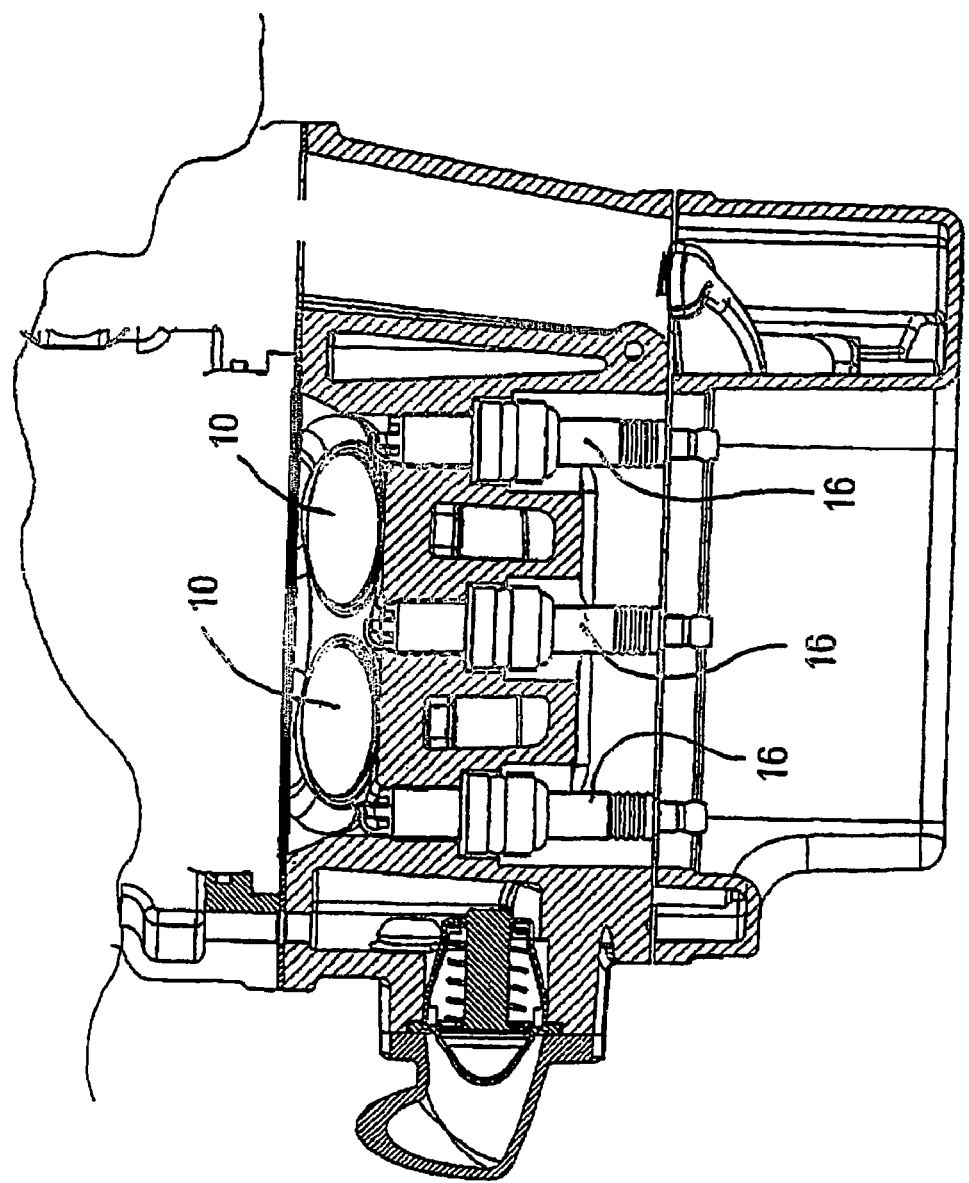
FIG. 4 is a detail of FIG. 2, showing spark plugs for the ignition of the fuel mixture inside the cylinders.
Figure 5:
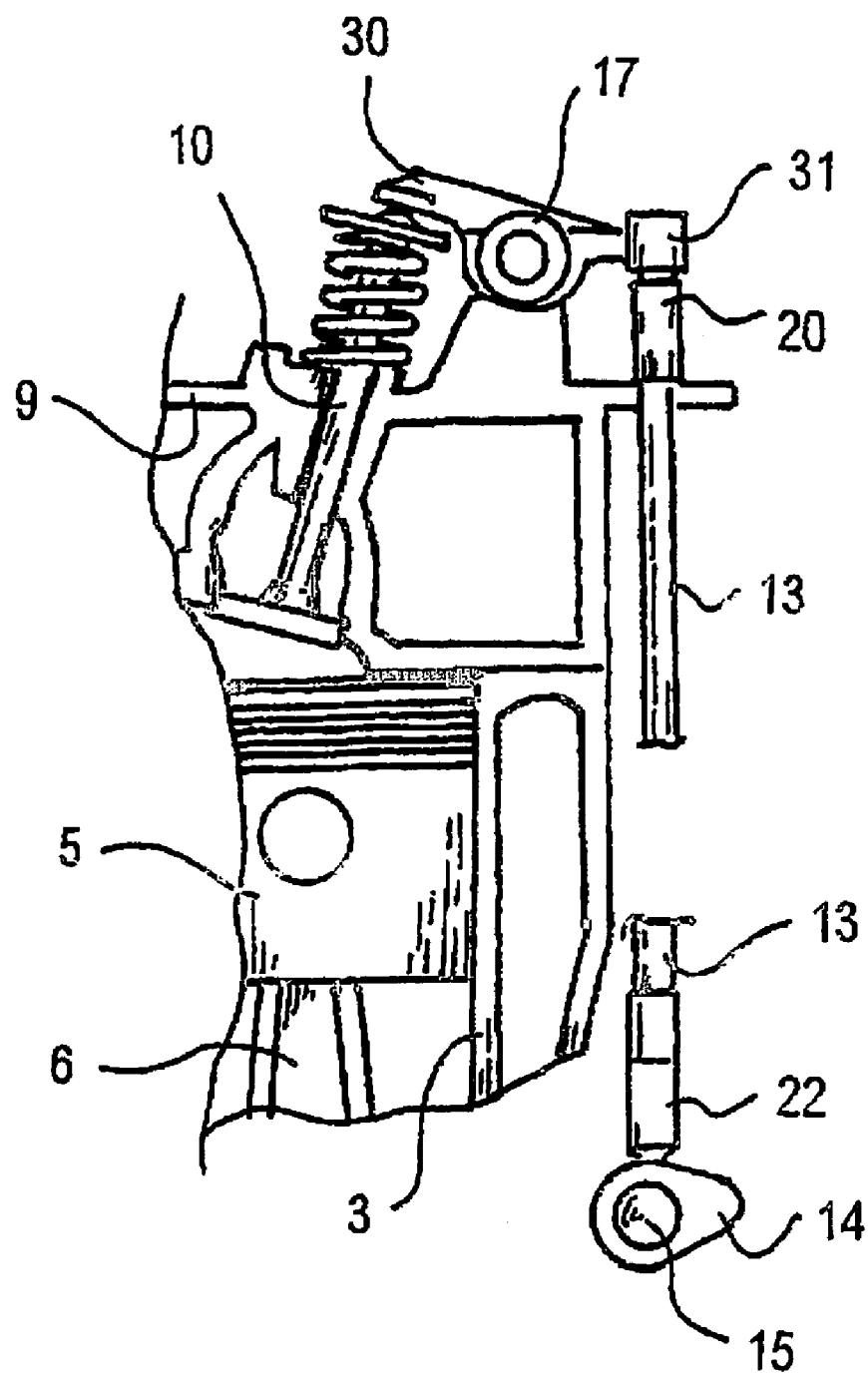
FIG. 5 is a schematic section that shows a distribution-valve arrangement associated with the engine and an actuating device for actuating the distribution-valve arrangement.
Figure 6:
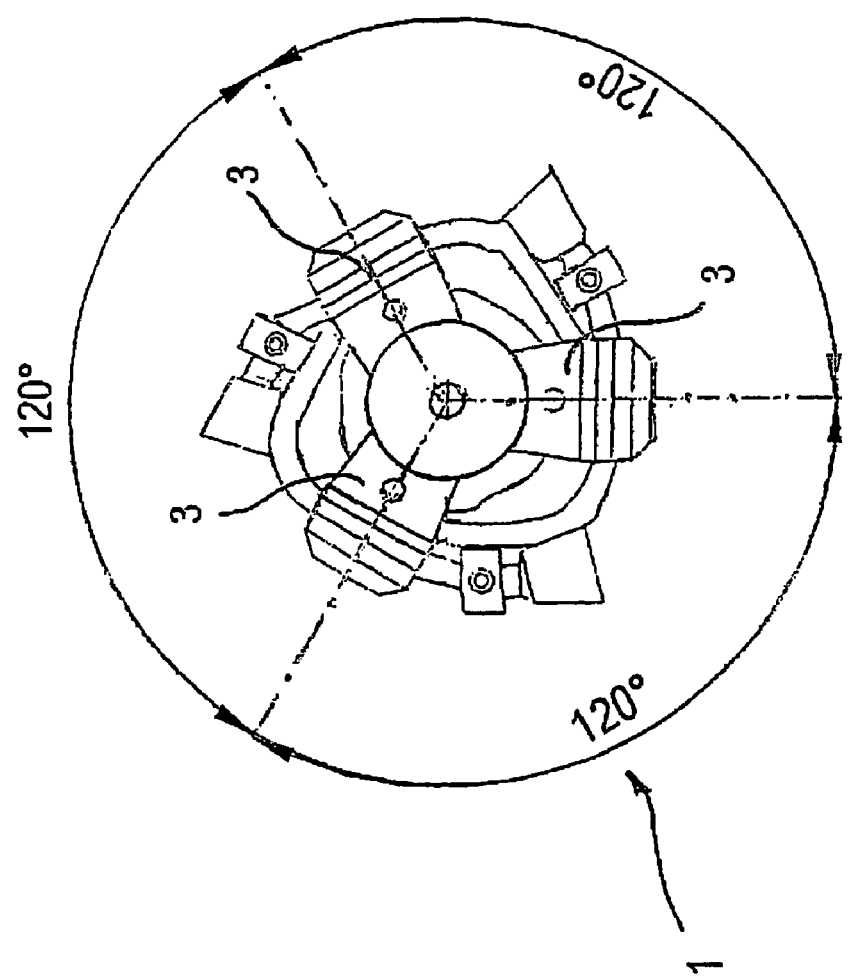
FIG. 6 is a schematic plan view of the engine of FIG. 1.

In other words, the spark plugs 16 are interposed between the pair of inlet valves 10a and the pair of exhaust valves 10b. Furthermore, as shown in FIG. 4, each inlet valve—and each exhaust valve—is interposed between two adjacent spark plugs 16.

Since three spark plugs 16 are provided in each cylinder 3, it is possible to obtain complete ignition of the fuel mixture, thereby reducing consumption, and to limit the number of inlet valves 10a.

As combustion is sparked simultaneously in three distinct zones of the cylinder 3, unlike what occurs in prior-art engines, numerous inlet valves are not necessary to create turbulence to encourage ignition of the fuel mixture.

The alternate arrangement of the inlet valves 10 and of the spark plugs 16 furthermore enables combustion of the entire mass of the fuel mixture.

Furthermore, the combustion occurs more rapidly and uniformly, said combustion being caused simultaneously in different zones of the combustion chamber.

In addition, the presence of three spark plugs arranged in the configuration disclosed above enables the number of inlet valves 10a to be limited to two, nevertheless ensuring efficient combustion.

This yet again enables a radial engine to be obtained that is of moderate weight and of limited overall dimensions.

Furthermore, the forces of inertia due to the valves and to the respective movement organs are reduced.

Figure 7:
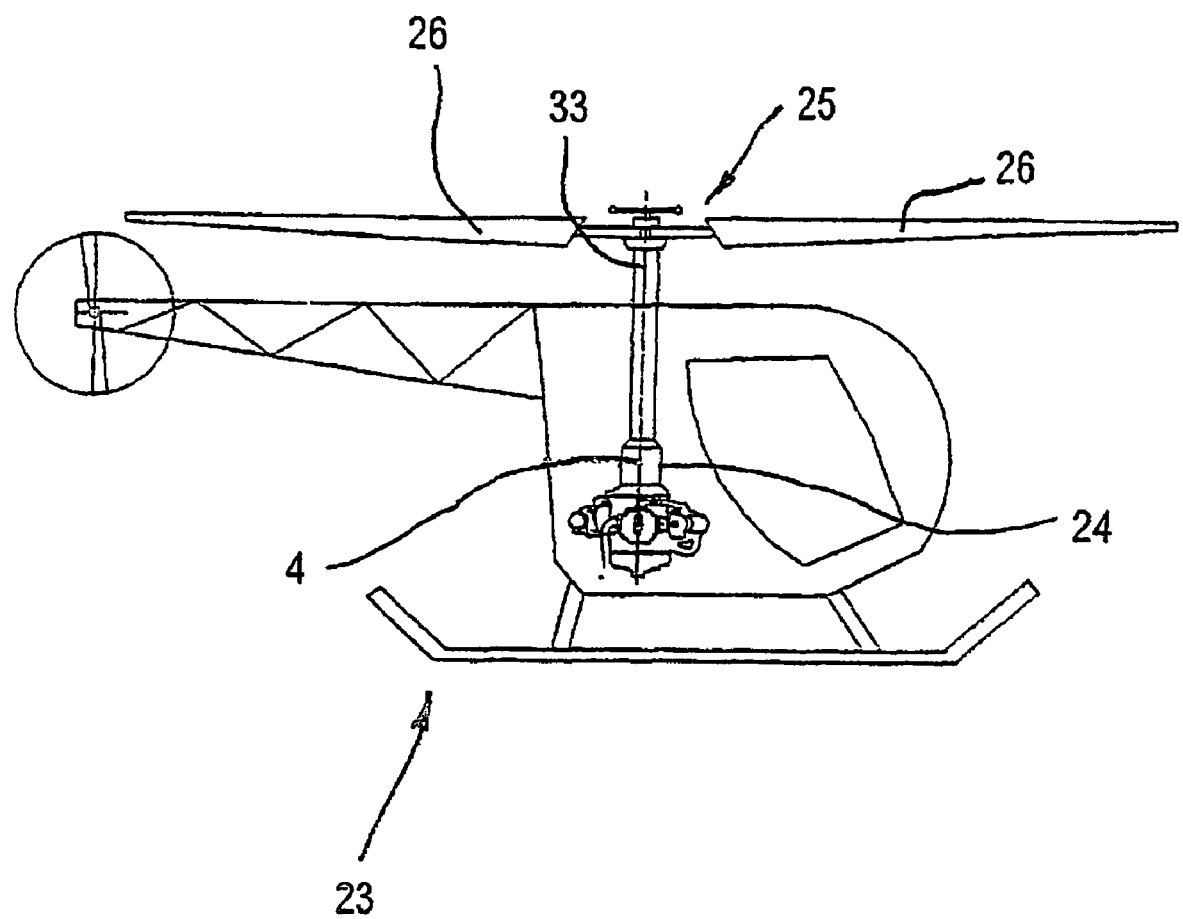
FIG. 7 is a schematic side view of a helicopter whereupon the radial engine of FIG. 1 is installed.
Figure 8:
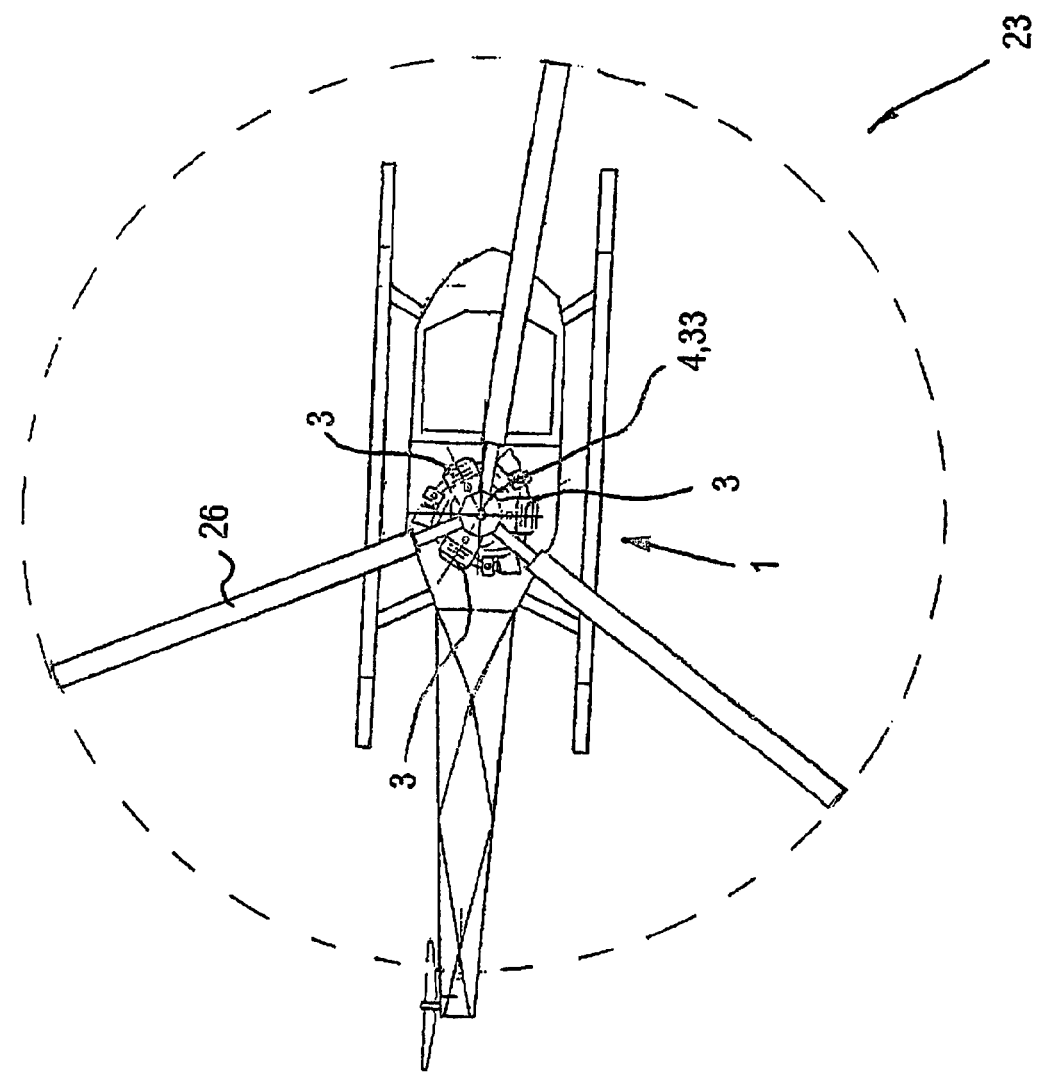
FIG. 8 is a view from above of the helicopter of FIG. 7.

With reference to FIGS. 7 and 8, a helicopter 23 is shown that is actuated by a radial engine 1 according to the invention.

The radial engine 1 is fitted to the helicopter 23 in such a way that the longitudinal axis 4 of the driving shaft 7 is aligned with a further longitudinal axis 33 of a main rotor 25, provided with rotating blades 26.

Between the driving shaft 7 and the main rotor 25 a reduction gear 24 is used that enables the main rotor 25 to be rotationally actuated at the desired speed.

The reduction gear 24 is so configured as to enable the main rotor 25 to rotate in a direction opposite the direction in which the driving shaft 7 rotates so as to reduce undesired gyroscopic effects and to consequently improve handling of the helicopter 23.

It should be noted that the radial engine 1 can be fitted in line with respect to the main rotor 25 owing to its reduced overall dimensions.

The reduction gear 24 may be of conventional type.

Furthermore, as the radial engine 1 and the main rotor 25 are aligned with one another it is not necessary to provide complex directing organs to transmit movement between the mutually tilted shafts.

The invention claimed is:

1. Four-stroke radial engine, comprising three cylinders arranged radially with respect to a driving shaft of said radial engine and pistons associated with said cylinders, said pistons are connected to said driving shaft by means of respective connecting rods and said connecting rods are rotatably supported on a same crank pivot of said driving shaft, wherein said connecting rods are offset along said crank pivot, said three cylinders are obtained in a stationary cylinder-block comprising an end wall and a further end wall opposite to said end wall, said end wall and said further end wall extending from a side wall of said cylinder-block, said end wall and said further end wall being provided with an opening housing a corresponding end of said driving shaft, said cylinder-block comprising a first part and a second part, said first part and said second part being mutually connected along contact surfaces arranged substantially transversely to said driving shaft.

2. Radial engine according to claim 1, wherein said three cylinders are arranged at angular intervals of 120° from one another.

3. Radial engine according to claim 1, wherein three spark plugs are associated with each of said cylinders.

4. Radial engine according to claim 3, wherein a distribution-valve arrangement is associated with each of said cylinders.

5. Radial engine according to claim 4, wherein said distribution-valve arrangement is interposed between two adjacent spark plugs.

6. Radial engine according to claim 5, wherein said distribution-valve arrangement comprises a pair of inlet valves.

7. Radial engine according to claim 6, wherein said distribution-valve arrangement comprises a pair of exhaust valves.

8. Radial engine according to claim 7, wherein said spark plugs are parallel to a longitudinal axis of said cylinder and lie on a plane passing through said longitudinal axis and containing said driving shaft.

9. Radial engine according to claim 8, wherein said pair of inlet valves and said pair of exhaust valves are arranged on opposite sides with respect to said plane.

10. Radial engine according to claim 9, wherein each inlet valve of said pair of inlet valves faces a corresponding exhaust valve of said pair of exhaust valves.

11. Radial engine according to claim 4, wherein said distribution-valve arrangement is actuated by a rocker-arm arrangement controlled by a cam arrangement through a push rod arrangement.

12. Radial engine according to claim 11, wherein said cam arrangement comprises a cam that is integral with a shaft actuated by said driving shaft by a gear transmission arrangement.

13. Aeroplane, comprising a four-stroke radial engine comprising three cylinders arranged radially with respect to a driving shaft of said radial engine and pistons associated with said cylinders, said pistons are connected to said driving shaft by means of respective connecting rods and said connecting rods are rotatably supported on a same crank pivot of said driving shaft, wherein said connecting rods are offset along said crank pivot, said three cylinders are obtained in a stationary cylinder-block comprising an end wall and a further end wall opposite to said end wall, said end wall and said further end wall extending from a side wall of said cylinder-block, said end wall and said further end wall being provided with an opening housing a corresponding end of said driving shaft, said cylinder-block comprising a first part and a second part, said first part and said second part being mutually connected along contact surfaces arranged substantially transversely to said driving shaft.

14. Helicopter, comprising a four-stroke radial engine comprising three cylinders arranged radially with respect to a driving shaft of said radial engine and pistons associated with said cylinders, said pistons are connected to said driving shaft by means of respective connecting rods and said connecting rods are rotatably supported on a same crank pivot of said driving shaft, wherein said connecting rods are offset along said crank pivot, said three cylinders are obtained in a stationary cylinder-block comprising an end wall and a further end wall opposite to said end wall, said end wall and said further end wail extending from a side wall of said cylinder-block, said end wall and said further end wail being provided with an opening housing a corresponding end of said driving shaft, said cylinder-block comprising a first part and a second part, said first part and said second pad being mutually connected along contact surfaces arranged substantially transversely to said driving shaft.

15. Helicopter according to claim 14, and further comprising a rotor, said rotor being coaxial to said radial engine.

16. Helicopter according to claim 15, wherein between said radial engine and said rotor a reduction gear is interposed.

17. Helicopter according to claim 16, wherein said reduction gear is so shaped as to enable said rotor to rotate in a direction opposite the direction in which said driving shaft rotates.

* * * * *